United States Patent
Ikeda

(10) Patent No.: US 6,640,857 B2
(45) Date of Patent: Nov. 4, 2003

(54) HEAVY-DUTY PNEUMATIC RADIAL TIRE AND WHEEL RIM ASSEMBLY WITH SUPPORT RING

(75) Inventor: Ikuji Ikeda, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/964,382

(22) Filed: Sep. 28, 2001

(65) Prior Publication Data

US 2002/0062896 A1 May 30, 2002

(30) Foreign Application Priority Data

Sep. 28, 2000 (JP) ........................................ 2000-297180

(51) Int. Cl.$^7$ ............................. B60C 3/06; B60C 17/04; B60C 111/00
(52) U.S. Cl. ..................... 152/158; 152/209.8; 152/456; 152/520; 152/DIG. 6
(58) Field of Search .......................... 152/DIG. 6, 455, 152/456, 158, 520, 209.8

(56) References Cited

U.S. PATENT DOCUMENTS

| 3,974,870 A | * | 8/1976 | Watts | ................ 152/DIG. 6 X |
| 4,641,670 A | * | 2/1987 | Poque et al. | ................ 152/158 |

FOREIGN PATENT DOCUMENTS

| FR | 796 666 A |   | 4/1936 |   |
| JP | 05139109 A | * | 6/1993 | .................. 152/455 |
| JP | 06092104 A | * | 4/1994 | .................. 152/455 |
| WO | WO 93/23258 A |   | 11/1993 |   |

OTHER PUBLICATIONS

Mechanics of Pneumatic Tires, ed. Samuel Clark: Department of Transportation, Aug. 1981, pp. 214–215.*

* cited by examiner

Primary Examiner—Adrienne C. Johnstone
(74) Attorney, Agent, or Firm—Birch, Stewart, Kolasch & Birch, LLP

(57) ABSTRACT

A heavy-duty pneumatic radial tire and rim assembly has a support ring within the tire to support the tire in a deflated condition, wherein the inner diameter Di of the inside bead portion which is inside with respect to the vehicle is substantially 80 to 200 mm larger than the inner diameter Do of the outside bead portion.

9 Claims, 2 Drawing Sheets

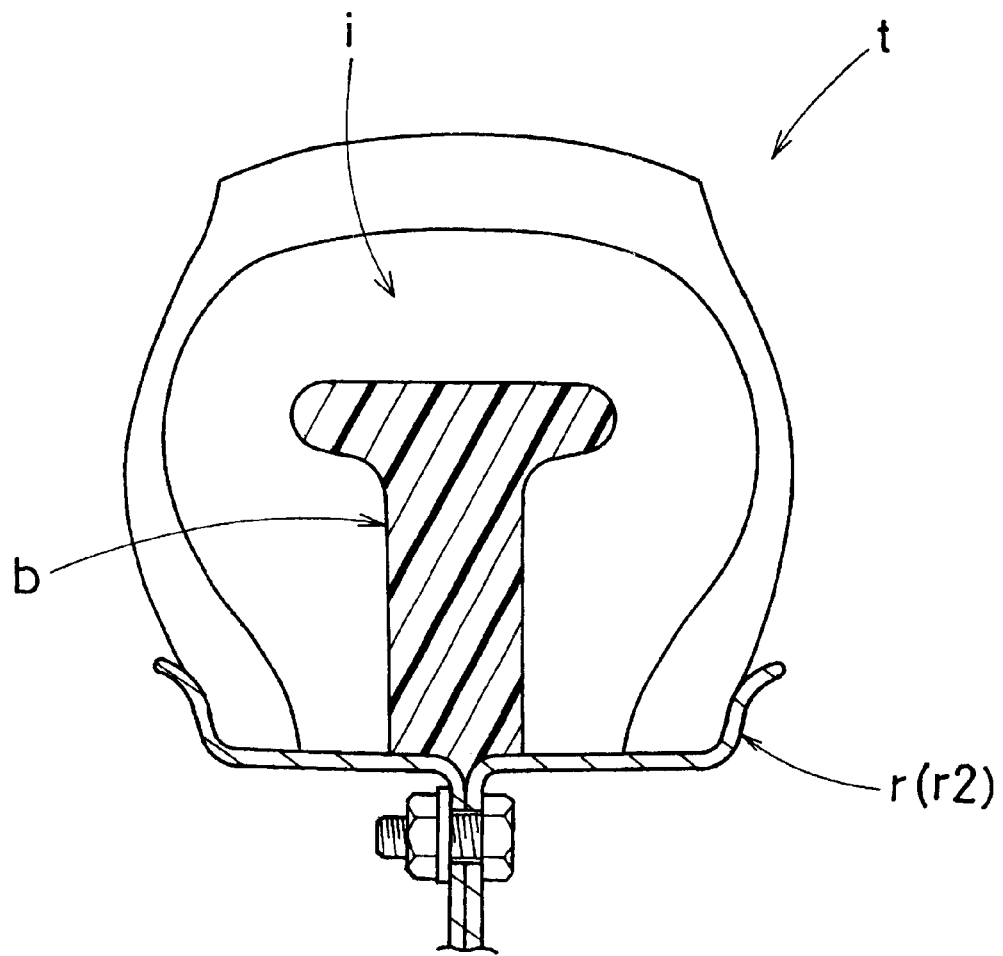

HEAVY-DUTY PNEUMATIC RADIAL TIRE AND WHEEL RIM ASSEMBLY WITH SUPPORT RING

BACKGROUND OF THE INVENTION

1. Field of the Invention

The present invention relates to a heavy-duty pneumatic radial tire and wheel rim assembly which can improve the ride comfort, stability of maneuverability, and decrease the partial wear or the like.

2. Description of the Prior Art

In general, a heavy-duty pneumatic radial tire adaptable to a bus, truck or the like, runs under a relatively large weight load. And especially, on the outside portion of the tire facing the outside of the vehicle in turning, an even larger load is applied and also, even at the tread portion, the shearing stress between the tread and load is increased. Therefore, especially as for the heavy-duty tire, it is preferred to have a high rigid region and anti-wear region at the outside portion of the tire in comparison to the inner portion of the tire.

However, the ordinary heavy-duty radial tire, is formed in bilateral symmetry with respect to the tire equator, in the meridian cross section of the tire, consequently, the tire lateral rigidity and anti-wear resistance and so on are substantially the same in both the inside portion and outside K portion. Consequently, when the tire is designed to obtain enough lateral rigidity so as to endure the cornering force, it decreases the ride comfort.

Since the weight o the heavy-duty tire is large, it is difficult to change the tire at the actual spot, even if the troubles such as puncture, valve failure, or the like occurs. Therefore, in the case of such a heavy-duty radial tire, as shown in FIG. 2, the support ring b to support the tire in a deflated condition is often inserted in the tire chamber i formed by the tire t and the wheel rim r. However, to install such a support ring r in the chamber i, it is often necessary to divide the rim into two halves r2, r2, and it makes for a complicated assembly of the tire with the rim and the support ring.

SUMMARY OF THE INVENTION

Accordingly, an object of the present invention is to provide a heavy-duty pneumatic radial tire and wheel rim assembly not exerting a baneful influence upon the ride comfort, improving the stability of maneuverability, and making it easy to assemble the support ring on the wheel rim.

SUMMARY OF THE INVENTION

The present invention is directed to a heavy-duty pneumatic radial tire and rim assembly having a support ring within the tire to support the tire in a deflated condition, characterized in that said heavy-duty pneumatic radial tire being composed of a tread portion, sidewall portions extending from the both ends of said tread portion, and a pair of bead portion formed at each end of said sidewall portion, the inner diameter Do of the outside bead portion, which is outside with respect to the vehicle, is substantially between 80 mm and 200 mm larger than the inner diameter Di of the outside bead portion.

BRIEF DESCRIPTION OF THE DRAWINGS

FIG. 2 is a cross sectional view of a tire of the ordinary support ring, tire and rim assembly.

DESCRIPTION OF THE PREFERRED EMBODIMENT

Figure 1:
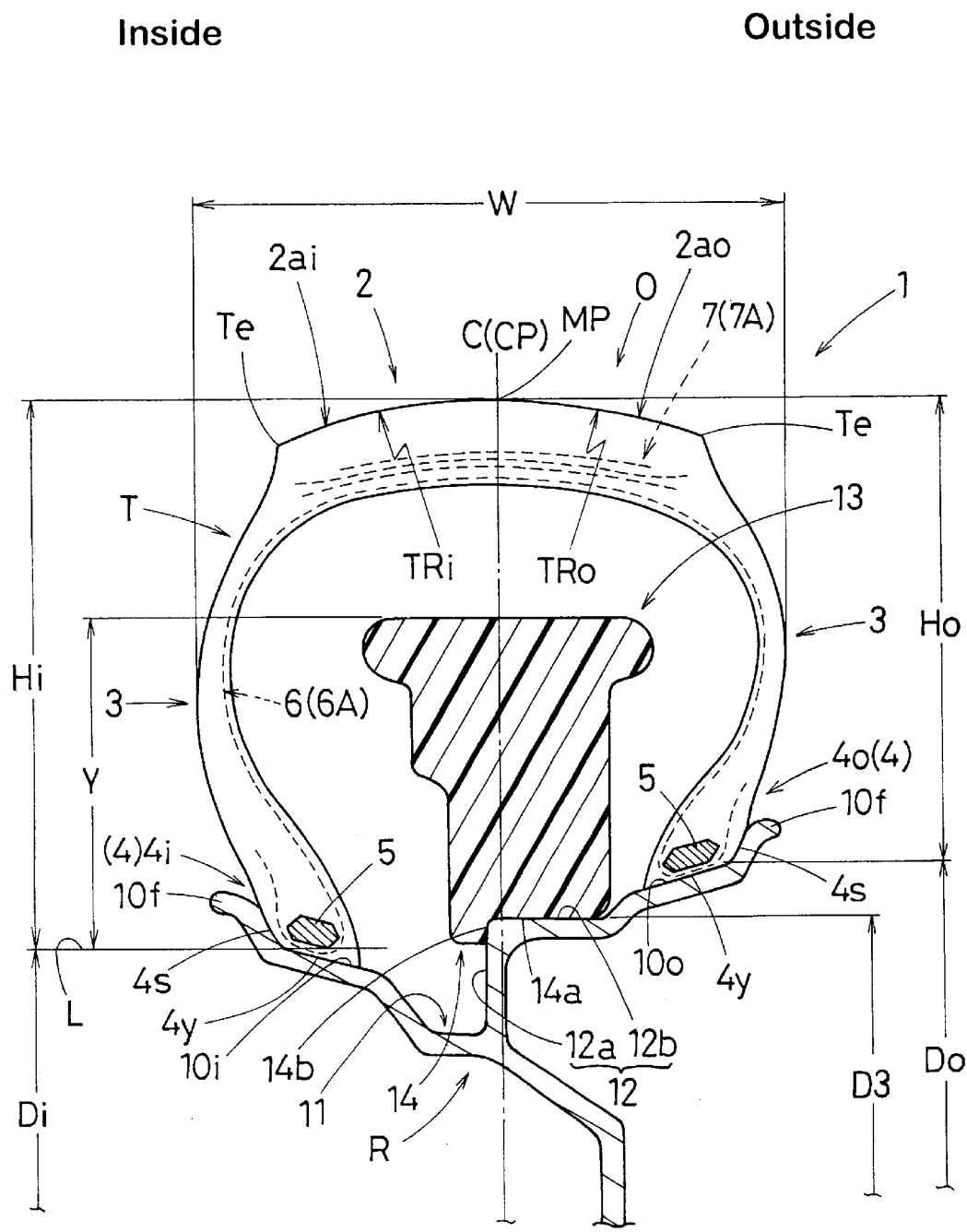
FIG. 1 is a cross sectional view of a tire and rim assembly in accordance with an embodiment of the present invention.

A description will be given of an embodiment in accordance with the present invention together with illustrated examples.

FIG. 1 shows a meridian cross section in the case that a pneumatic tire and rim assembly 1 in accordance with the present invention is formed by the heavy-duty pneumatic radial tire T and a rim R.

In FIG. 1, the tire 1 is provided with a tread portion 2, a pair of side wall portions 3,3 extending to an inner portion in a tire radial direction from both ends thereof and bead portions 4 arranged in inner ends in the tire radial direction of the respective side wall portion 3, and a tubeless type T is exemplified.

The tire T is reinforced by code layers including carcasses 6 extending between the bead portions 4 and 4 and belt layers 7 arranged in outer sides in a radial direction of the carcasses 6.

The carcass 6 is constituted by one or more, in the present embodiment one, carcass ply extending from the tread portion 2 through the side wall portion 2 and folded around a bead core 5 of the bead portion 4, and this carcass ply arranges the carcass code at an angle between 75 and 90 degrees with respect to a tire equator C. As the carcass code, a steel code is suitably employed.

Further, the belt layer 7 is constituted by two or more, in the present embodiment two, belt plies 7A arranging belt codes having a high strength at an angle between 10 and 45 degrees with respect to the tire equator C, and the respective belt codes cross to each other between the plies. In the present embodiment, a case of employing the steel code as the belt code will be exemplified.

The bead portions 4 in the embodiment, comprises an outside bead portion 4o seating on the rim R at outside of the car(far side from the centerline of the car or vehicle), and an inside bead portion 4i seating on the rim R at inside of the car(near side from the centerline of the car or vehicle). Each bead portions 4o, 4i is constructed in a concentric configuration, but the inner diameter Do of outside bead portion 4o is larger than the inner diameter Di of inside bead portion 4i in the range from 80 mm to 200 mm. That is, the tire T of the invention is dissymmetryl with respect to the equator C.

The difference of the inner diameter of the inside bead portion 4i and of the outside bead portion 4o resulting in the differences in radial lengths between the inside and outside flexible sidewall portions, directly affects the tire lateral rigidity. That is, since the lateral rigidity of outside portion o of the tire T grows bigger than that of the inside portion I of the tire, the stability of maneuverability is increased. Conversely, inside portion I of the tire can prevent from the aggravation of ride comfort, since the lateral rigidity of that is relatively small. As the result, the stability of maneuverability and ride comfort ability can be compatible at high level.

When the difference (Do−Di) is less than 80 mm, the difference of lateral rigidity between the inner portion I of the tire and the outer portion O of the tire is not enough, it becomes difficult to get both functions of the stability of maneuverability and ride comfort ability. Conversely, the differences (Do−Di) exceeds 200 mm, the difference in the lateral rigidity becomes excessive, and deteriorates the balance between the stability of maneuverability and ride comfort. Considering from such a viewpoint, the desirable difference of (Do−Di) is substantially 100–152 mm. Also, each inner diameter Do, Di is preferably selected in the range of 381–660 mm (15–26 inches). Besides, the difference (Do−Di) of from 80 mm to 200 mm is preferably equivalent to 35–55% of the tire maximum width W. The thickness or materials of the inside or outside bead portion can be made substantially the same.

The aforesaid bead inner diameter Di, Do is the diameter of the internal surface 4y of the bead hole. In case that the line of the bead hole in the meridian cross section is inclined with respect to the tire axis, the bead diameter Di, Do is defined as the diameter of the intersecting point of the extensions of the line of the internal surface 4y and the line of the outside plane of bead 4s mounted on the rim R.

In the embodiment, the value of the inside aspect ratio Ai (inner side of the car) is different from the outside aspect ratio Ao (outer side of the car), owing to the difference between the aforesaid bead inner diameter Di, Do. In the tire T, the inside aspect ratio Ai (=Hi/W) of the inside tire section height Hi which is the radial distance between the maximum diameter point MP of the tread and the inner surface of the bead heel at the inside bead portion 4i to the tire maximum width W, is larger than the value of the outside aspect ratio Ao (=Ho/W) of the outside tire section height Ho which is the radial distance between the maximum diameter point MP of the tread and the inner surface of the bead heel at the outside bead portion 4o to the tire maximum width W.

The tire T of such construction, owing to small outside aspect ratio Ao (low ratio)of the outside bead region 4o, on which large load applies at the cornering, the lateral rigidity is increased, resulting in the improvement of the stability of maneuverability. On the other hand, the relatively large inside aspect ratio Ai(high ratio) of the inside bead portion 4i, increases the radial flexibility thereof and the effect of shock absorber preventing deterioration of ride comfort.

The ratio (Ai/Ao) is substantially between 1.05 and 1.82, preferably between 1.25 and 1.55. When the ratio (Ai/Ao) is less than 1.05, it becomes difficult to reconcile ride comfort and the stability of maneuverability, since the difference of the aspect ratio is too small, whereas when the ratio exceeds 1.82, the difference is too large and affects the deterioration of the balance of ride comfort and the stability of maneuverability. To balance the stability of maneuverability and ride comfort, it is preferable to select the outside ratio Ao being between 0.55 and 0.75, and the inside ratio Ai is between 0.8 and 1.0.

Also, in the embodiment, the radius Tro of the outside tread surface 2ao between the tread center CP (tire equator) which pass through the center of the tread portion 2 between the tread edges te, te, and the outside edge te of the tread is between 50 mm and 100 mm larger than the radius of the inside tread surface 2ai. Namely, owing to flatten the outside tread surface 2ao, and to round the inside tread surface 2ai, anti-wearing ability of the outside tread surface 2ao and therefore the wear-life are increased, preventing the partial wearing of the inside tread portion 2ai.

The aforesaid outside tread surface 2ao extents from the tire equator C to the outside tread egde te in axial direction and terminate thereat. And inside tread surface 2ai joints smoothly at the tire equator with the outside tread surface 2ao and extents in axial direction to the inside tread edge te and terminates thereat. And the radius TRo of the outside tread surface 2ao is e.g. between 450 mm and 650 mm, preferably, in the range from 500 mm to 600 mm. Still, the radii Tro, Tri, the aspect ratios Ao, Ai are measured under the conditions in which the tire is mounted on the rim, inflated, no load, and on the basis of the manufacturer's instruction and tire standards.

The rim R comprises an inside rim-seat surface 10i which supports the inside bead portion 4i of the tire, and an outside rim-seat surface 10o of larger diameter which supports the outside bead portion 4o of the tire, as united in one. And at each axial outer ends of the rim-seat 10i, 10o, is formed a flange of small height (radial height is approximately 12 mm) And each outer diameter of the rim-seat 10i, 10o is substantially the same as that of the bead inner diameter Di, Do.

For the sake of the rim R having the inside rim-seat 10i of small diameter, the tire is easy to assemble, since the outer side rim-seat 10o is enable to pass through the inside rim-seat 10i and to mount on the outside rim-seat 10o, resulting in improvement of the work efficiency of rim-assembly.

Each rim-seat 10i, 10o is conventional 15° taper tilting at the angle 15°±1° with respect to the tire axis. Therefore, to inflate the chamber inside the tire, the outside bead portion 4o and the inside bead portion 4i ascent the taper rim and are bound tight on the respective rim-seat 10i, 10o, and jointed together tightly.

The rim R has a rim-well 11 and a mounting portion 12 to install the support ring 13. The depth and width of the rim-well 11 is enough to drop a part of the inside bead portion 4i. And during the rim-assembling, the part of inside bead portion 4i is dropped into this rim-well. As the result, the inside bead portion 4i which has a small diameter gets over the flange 10f of the inside rim-seat 10i, and, with returning, is able to be mounted on the inside rim-seat 10i.

The mounting portion 12, in the embodiment, comprises a rising portion 12a facing the rim-well 11, which extends radially outwardly from the bottom of rim-well 11, and a bearing seat 12b which bends approximately horizontally from the top of the rising portion 12a, and extending to the outside rim-seat 10o. And the support ring 13 is mounted on the mounting portion 12 to support the tire in deflated condition.

The support ring 13 is in a shape such as annular or continuous ring, and is made of preferably resilient plastic, hard rubber or the like. The support ring 13 may be two or three divided members which can be made circular, and may be also circular from the first.

The height Y of the support ring 13, in the meridian cross section, from the line L parallel to the tire axis and passing through the point of intersection of the extension of line of bead inner surface 4y and line of the outside plane of bead 4s is between 0.50 time and 0.85 times the inside tire section height Hi. In case that the height Y of the support ring 13 is less than 0.5 times the height Hi, the radial deflection of the tire which is supported by the support ring 13 increases and is apt to concentrate the stress partially resulting in the evolution of heat. When the height Y is more than 0.85 times the inside section height Hi, it may contact with the inner surface of the inflated tire and deteriorates the running stability.

In the embodiment, the inner surface 14 of the support ring 13 has a seating plain 14a, the diameter of which being slightly less than that of the bearing seat 12b of the mounting portion 12, and a drooping seat 14b which contacts with the rising portion 12a of the support ring 12 and engaged therewith. The inner diameter D3 of the seating portion 14a of the support ring 13 is larger than the inner diameter Di of the inside bead portion 4i, and smaller than the inner diameter Do of the outside bead portion 4o. Consequently, by pushing the support ring 13 at around the inner surface 14 from the inside rim-seat 10i to the outside rim-seat 10o, the support ring 13 is easily engaged with the rim R, the drooping seat 14b being in contact with the rising portion 12a. Besides, the drooping seat 14b being contact with the rising portion 12a, the support ring 13 is positioned at the accurate place.

The support ring 13 is assembled on the mounting portion 12 at the same time of assembling the tire T on the rim R, by the support ring 12 being held in the tire T. That is, in the state where the inside bead portion 4i being dropped in the rim-well, the support ring 13 is pushed into through the inside bead portion 4i towards the outside rim-seat 10o, and the support ring 13 is mounted on the mounting portion 12. As a result, it is unnecessary to divide the support ring 13 into two halves, and to assemble the divided two halves in one, which can increase the productivity of rim-tire assembling.

EXAMPLE

Heavy duty pneumatic radial tires with a tire size of 11R22.5 having the structure shown in FIG. 1 are manufactured by way of trial experiment on the basis of a specification in Table 1, and FIG. 1. The tires are mounted at front wheels of 2-D-D 10 tonnage truck, to test with respect to a ride comfort, operation stability(stability of maneuverability), anti-wearing performance and the productivity of rim-tire assembling. For comparison, the ordinary tires are also tested. Still the support ring is made of plastic and the ratio Y/Hi is 70%. The other specifications are the same in the respective tires.

(1) Ride Comfort

The tires are tested on a dry asphalt road surface in a tire test course. Characteristics concerning to ride comfort, such as handle response, a rigid feeling, a gripping, goading feeling and the like are expressed by an index obtained by setting a comparative example 1 (a conventional example) to 100 in accordance with a driver's sensuous estimate. The larger index means a better structure. The results of each test are shown in Table 1.

(2) Stability of Maneuverability

The tire to be tested on the dry asphalt road surface in the same tire test course. Characteristics concerning to the stability of maneuverability such as handle responsiveness, rigid feeling, endurable feeling at cornering, and the like are expressed by an index obtained by setting a comparative example 1 (a conventional example) to 100 in accordance with a driver's sensuous estimate. The larger index means a better structure.

(3) Wearing Test

By the vehicle in the item (1), the wearing test is performed on a test course resembles the urban road and high-way by traveling through 10,000 km in sum. And wearing condition including an overall wearing amount of tread surface as well as the existence of partial wear are observed. The characteristics are expressed by the index obtained by setting the comparative example 1 (the conventional embodiment) to 100. The larger index means a better structure.

(4) Rim-assembling Test

Man-hours for rim assembling (including the hours for installation of the support ring) are estimated by multiplying the working hours by the number of workers and expressed by an index obtained by setting a comparative example 1 (a conventional example) to 100. The larger index means a better structure.

TABLE 1

| | Example 1 | Example 2 | Embodiment |
|---|---|---|---|
| Tire dia (mm) | 1052 | 1052 | 1052 |
| Inner dia.Do of outside bead portion (mm) | 571.5 | 660.4 | 660.4 |
| Inner dia.Di of inside bead portion (mm) | 571.5 | 660.4 | 508 |
| (Do-Di) (mm) | 0 | 0 | 152.4 |
| Radius of outside tread surface TRo (mm) | 530 | 530 | 550 |
| Radius of inside tread surface TRi (mm) | 530 | 530 | 500 |
| Outside aspect ratio (Ao) | 0.92 | 0.69 | 0.69 |
| Inside aspect ratio (Ai) | 0.92 | 0.69 | 0.95 |
| (Ai/Ao) | 1 | 1 | 1.37 |
| Ride comfort (index) | 100 | 80 | 100 |
| Stability of maneuverability (index) | 100 | 130 | 130 |
| Anti-wearing (index) | 100 | 90 | 120 |
| Work efficiency of rim-assembly | 100 | 90 | 150 |

As shown in Table 1, it is recognized that the tire in accordance with the embodiment can reconcile the ride comfort and stability of maneuverability.

What is claimed is:

1. A heavy-duty Pneumatic radial tire comprising
   a tread portion with an outside tread edge and an inside tread edge,
   an outside sidewall portion extending radially inwardly from the outside tread edge,
   an inside sidewall portion extending radially inwardly from the inside tread edge,
   an outside bead portion with an inner diameter Do at the radially inner end of the outside sidewall portion,
   an inside bead portion with an inner diameter Di at the radially inner end of the inside sidewall portion, wherein
   the diameter Do is substantially between 80 mm and 200 mm larger than the diameter Di, and
   said tread portion is provided with an outside tread surface defined between the tread center and the outside tread edge and an inside tread surface defined between the tread center and the inside tread edge, wherein a radius of curvature of the outside tread surface is between 50 mm and 100 mm larger than a radius of curvature of the inside tread surface.

2. A heavy-duty pneumatic radial tire comprising
   a tread portion with an outside tread edge and an inside tread edge,
   an outside sidewall portion extending radially inwardly from the outside tread edge,
   an inside sidewall portion extending radially inwardly from the inside tread edge,
   an outside bead portion with an inner diameter Do at the radially inner end of the outside sidewall portion,
   an inside bead portion with an inner diameter Di at the radially inner end of the inside sidewall portion, wherein
   the diameter Do is substantially between 80 mm and 200 mm larger than the diameter Di,
   the difference (Do- Di) therebetween is in a range of from 35% to 55% of the tire maximum width W, and
   said tread portion is provided with an outside tread surface defined between the tread center and the outside tread edge and an inside tread surface defined between the tread center and the inside tread edge, wherein a radius of curvature of the outside tread surface is between 50 mm and 100 mm larger than a radius of curvature of the inside tread surface.

3. A heavy-duty pneumatic radial tire according to claim 1 or 2, wherein an inside aspect ratio Ai is substantially between 1.05 and 1.82 times an outside aspect ratio Ao, wherein the inside aspect ratio Ai (=Hi/W) is defined as the ratio of the inside tire section height Hi, measured radially between the maximum diameter point MP of the tread and the inner surface of the bead heel at the inside bead portion, to the tire maximum width W, and the outside aspect ratio Ao (=Ho/W) is defined as the ratio of the outside tire section height Ho, measured radially between the maximum diameter point MP of the tread and the inner surface of the bead heel at the outside bead portion, to the tire maximum width W.

4. A heavy-duty pneumatic radial tire according to claim 1 or 2, wherein an outside aspect ratio Ao is in a range of from 0.55 to 0.75 and an inside aspect ratio Ai is in a range of from 0.8 to 1.0, wherein the inside aspect ratio Ai (=Hi/W) is defined as the ratio of the inside tire section height Hi, measured radially between the maximum diameter point MP of the tread and the inner surface of the bead heel at the inside bead portion, to the tire maximum width W, and the outside aspect ratio Ao (=Ho/W) is defined as the ratio of the outside tire section height Ho, measured radially between the maximum diameter point MP of the tread and the inner surface of the bead heel at the outside bead portion, to the tire maximum width W.

5. A heavy-duty pneumatic radial tire according to claim 1 or 2, wherein an outside aspect ratio Ao is in a range of from 0.55 to 0.75, an inside aspect ratio Ai is in a range of from 0.8 to 1.0 and the inside aspect ratio Ai is substantially between 1.05 and 1.82 times the outside aspect ratio Ao, wherein the inside aspect ratio Ai (=Hi/W) is defined as the ratio of the inside tire section height Hi, measured radially between the maximum diameter point MP of the tread and the inner surface of the bead heel at the inside bead portion, to the tire maximum width W, and the outside aspect ratio Ao (=Ho/W) is defined as the ratio of the outside tire section height Ho, measured radially between the maximum diameter point MP of the tread and the inner surface of the bead heel at the outside bead portion, to the tire maximum width W.

6. An assembly of a heavy-duty pneumatic radial tire, a wheel rim and a support ring to be disposed in the tire to support the tire in a deflated condition, said heavy-duty pneumatic radial tire comprising a tread portion with an outside tread edge and an inside tread edge, an outside sidewall portion extending radially inwardly from the outside tread edge, an inside sidewall portion extending radially inwardly from the inside tread edge, an outside bead portion with an inner diameter Do at the radially inner end of the outside sidewall portion, an inside bead portion with an inner diameter Di at the radially inner end of the inside sidewall portion, wherein the diameter Do is substantially between 80 mm and 200 mm larger than the diameter Di, and the radius of curvature of an outside tread surface between the tread center and the outside tread edge is between 50 mm and 100 mm larger than the radius of curvature of an inside tread surface between the tread center and the inside tread edge.

7. An assembly of a heavy-duty pneumatic radial tire, a wheel rim and a support ring to be disposed in the tire to support the tire in a deflated condition, said heavy-duty pneumatic radial tire comprising a tread portion with an outside tread edge and an inside tread edge, an outside sidewall portion extending radially inwardly from the outside tread edge, an inside sidewall portion extending radially inwardly from the inside tread edge, an outside bead portion with an inner diameter Do at the radially inner end of the outside sidewall portion, an inside bead portion with an inner diameter Di at the radially inner end of the inside sidewall portion, wherein the diameter Do is substantially between 80 mm and 200 mm larger than the diameter Di, the difference (Do–Di) therebetween is in a range of from 35% to 55% of the tire maximum width W, and the radius of curvature of an outside tread surface between the tread center and the outside tread edge is between 50 mm and 100 mm larger than the radius of curvature of an inside tread surface between the tread center and the inside tread edge.

8. An assembly as claimed in claim 6 or 7 wherein an inside aspect ratio Ai is substantially between 1.05 and 1.82 times an outside aspect ratio Ao wherein the inside aspect ratio Ai (=Hi/W) is defined as the ratio of the inside tire section height Hi, measured radially between the maximum diameter point MP of the tread and the inner surface of the bead heel at the inside bead portion, to the tire maximum width W, and the outside aspect ratio Ao (=Ho/W) is defined as the ratio of the outside tire section height $Ho_1$ measured radially between the maximum diameter point MP of the tread and the inner surface of the bead heel at the outside bead portion, to the tire maximum width W.

9. An assembly as claimed in claim 8 wherein the outside aspect ratio Ao is between 0.55 and 0.75, and the inside aspect ratio Ai is between 0.8 and 1.0.

* * * * *